(12) United States Patent
Cadeddu et al.

(10) Patent No.: US 8,177,306 B2
(45) Date of Patent: May 15, 2012

(54) TWO MASTER CYLINDER BRAKING SYSTEM FOR A VEHICLE HAVING A SAFETY FUNCTION

(75) Inventors: Leonardo Cadeddu, Crema (IT); Luigi Alberti, Cremosano (IT)

(73) Assignee: VHIT S.p.A., Offanengo (IT)

( * ) Notice: Subject to any disclaimer, the term of this patent is extended or adjusted under 35 U.S.C. 154(b) by 1266 days.

(21) Appl. No.: 11/886,331

(22) PCT Filed: Mar. 20, 2006

(86) PCT No.: PCT/EP2006/002818
§ 371 (c)(1),
(2), (4) Date: Sep. 14, 2007

(87) PCT Pub. No.: WO2006/103049
PCT Pub. Date: Oct. 5, 2006

(65) Prior Publication Data
US 2008/0164113 A1  Jul. 10, 2008

(30) Foreign Application Priority Data
Mar. 30, 2005  (IT) .............................. TO2005A0206

(51) Int. Cl.
*B60T 13/00* (2006.01)
(52) U.S. Cl. ...................................... 303/9.61; 188/345
(58) Field of Classification Search .............. 188/106 P, 188/345; 303/9.61; 60/567, 591
See application file for complete search history.

(56) References Cited

U.S. PATENT DOCUMENTS

| | | | |
|---|---|---|---|
| 3,640,067 A | | 2/1972 | Ingram |
| 4,026,319 A | * | 5/1977 | Pickering ...................... 137/255 |
| 4,547,967 A | * | 10/1985 | Reynolds et al. ................. 303/7 |
| 4,702,330 A | | 10/1987 | Vatter et al. |
| 4,828,333 A | * | 5/1989 | Reinartz et al. ............... 303/155 |
| 6,217,128 B1 | * | 4/2001 | Tillman, Jr. .................. 303/9.61 |

FOREIGN PATENT DOCUMENTS

| | | |
|---|---|---|
| DE | 32 36 393 A1 | 4/1984 |
| DE | 33 05 856 A1 | 8/1984 |
| DE | 36 15 045 A1 | 11/1987 |
| GB | 2 140 111 A | 11/1984 |

* cited by examiner

*Primary Examiner* — Robert A Siconolfi
*Assistant Examiner* — Stephen Bowes
(74) *Attorney, Agent, or Firm* — Young & Thompson

(57) ABSTRACT

A braking system for a vehicle having two pairs of wheels, has two master cylinders operating as pumps, wherein each master cylinder is operated by its own brake pedal and controls the braking on one rear wheel, as well as on the front wheels through a valve for the disconnection of the front vehicle braking. Each master cylinder is of the tandem type including two sections, the first section controlling the braking of the front wheels through the valve, whereas the second section controls the braking of that rear wheel, being a part of the pair of rear wheels, which is associated with the master cylinder. The first sections of both master cylinders are supplied by a first oil reservoir and the second sections of both master cylinders are supplied by a second oil reservoir at least partially independent from the first oil reservoir.

2 Claims, 4 Drawing Sheets

TWO MASTER CYLINDER BRAKING SYSTEM FOR A VEHICLE HAVING A SAFETY FUNCTION

The subject of the present invention is a braking system for a vehicle, characterized by features intended to accomplish a safety function.

In some vehicles, especially the farm tractors and the like, the hydraulic braking system comprises two master cylinders operating as pumps, which are controlled by two separate brake pedals, and each master cylinder controls the braking on one of the rear wheels (the left and the right rear wheels). This arrangement has the purpose of allowing a different braking of the two side wheels, for example in order to render more easy the vehicle rotation for inverting the travel direction during a field working along adjacent gangways which are covered in alternatively opposite directions. However, when a bilateral braking is commanded by operating both braking pedals, in general the system may be non-balanced because of the two separate braking systems taking up different oil quantities, whereby a correspondingly non-balanced braking may follow. In order to avoid this disadvantage, a transfer duct is provided, which mutually communicates both the circuits when both brake pedals are simultaneously operated. The balance function is exerted by valves installed on the pistons of the master cylinders, which valves are normally closed, and are opened when the pistons travel along a pre-established stroke.

The vehicles equipped with the above system may be missing any brake device acting onto the front wheels. However some vehicles using such systems also have brake devices acting onto the front wheels. In such case the system is provided with a hydraulic valve which disconnects the braking of the front wheels when a single brake pedal is actuated, whereas all the four wheels are braked when both brake pedals are simultaneously actuated.

A serious disadvantage of these kinds of systems resides in the fact that, if a breakdown takes place in any circuit branch and causes oil leakage, the braking action is entirely lost on all the wheels, with a serious prejudice for the safety for the vehicle operator and any vehicle occupants.

Therefore, the main object of this invention is to prevent the cited disadvantage of the known systems of the considered kind, by ensuring that, when a breakdown takes place in any circuit branch, the braking is maintained in activity on an axle (the front or the rear axle) of the vehicle.

According to the invention, in a braking system for a vehicle having two pairs of wheels all provided with brake devices, the system comprising two master cylinders operating as pumps, wherein each master cylinder is operated by its own brake pedal and controls the braking on one rear wheel, as well as on the front wheels through a valve for the disconnection of the front vehicle braking, this valve disconnecting the front wheels braking when a single brake pedal is actuated, the stated object is attained in that each master cylinder is of the tandem type comprising two sections, the first section of the tandem master cylinder controlling the front wheels braking, whereas the second section of the tandem master cylinder controls the braking of that wheel, being a part of the pair of rear wheels, which is associated with said tandem master cylinder, the first sections of both tandem master cylinders being supplied by a first oil reservoir and the second sections of both tandem master cylinders being supplied by a second oil reservoir, at least partially independent from the first oil reservoir.

Constructively, both the first and the second oil reservoirs may be formed by two sections of a single oil reservoir, mutually separated only in the bottom portion of the oil reservoir.

In this way, until the different circuit branches operate correctly, the system according to the invention behaves like a usual system, each brake pedal acting onto the corresponding vehicle rear side wheel when it is actuated singularly, whereas the simultaneous actuation of both brake pedals causes all the wheels to be braked. However, when a circuit branch suffers a breakdown and causes the leakage of the oil coming from the first or the second oil reservoir which supplies the corresponding first or second section of the tandem master cylinders, which is involved in the breakdown, the remaining second or first sections of the tandem master cylinders still are supplied by the second or the first reservoir, which is not involved in the breakdown, thus ensuring the braking action onto a vehicle axle, respectively the rear axle or the front axle of the vehicle.

In this manner, the total loss of the vehicle braking action in the case of a breakdown of any branch of the braking system is prevented Two separate balancing valves are provided, the one between the hydraulic braking control circuits of the front wheels, and the other between the hydraulic braking control circuits of the rear wheels, whereby the balancing of the bilateral braking is ensured as in the known systems, without jeopardizing the main feature of the invention, which is intended to prevent the total loss of the braking action in the case of a breakdown.

Said balancing valves can be installed on the two pistons of each tandem master cylinder.

The valve for the disconnection of the braking of the front wheels is installed in order to operate on the braking control branches of the front wheels, in a manner entirely corresponding to the operation of the known systems.

These and other features, objects and advantages of the subject of the present invention will more clearly appear from the following description of an embodiment, being a non limiting example, with reference to the accompanying drawings, wherein.

Figure 4:
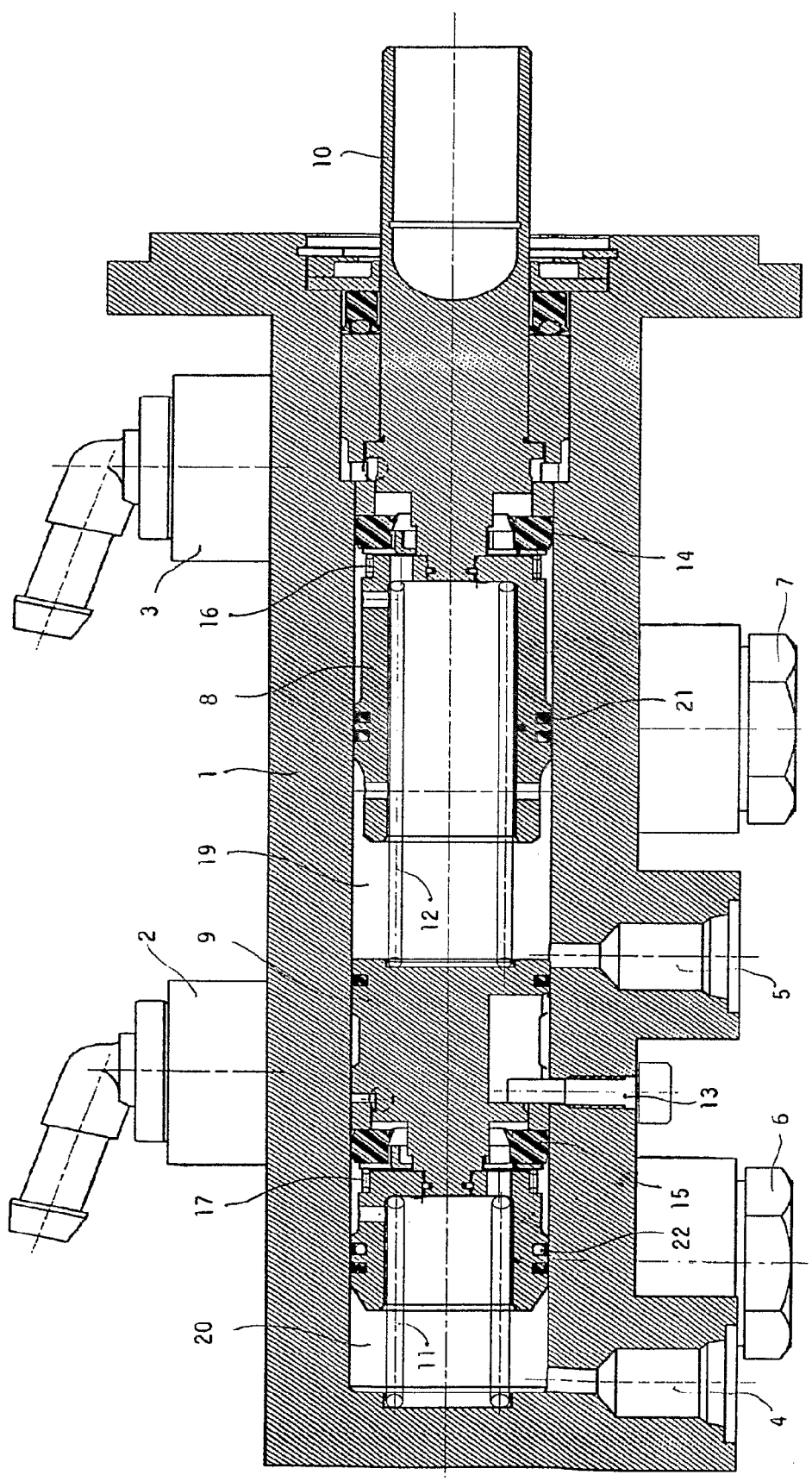
FIG. 4 shows in a cross section an embodiment of a tandem master cylinder used according to the invention, in the rest position.
Figure 5:
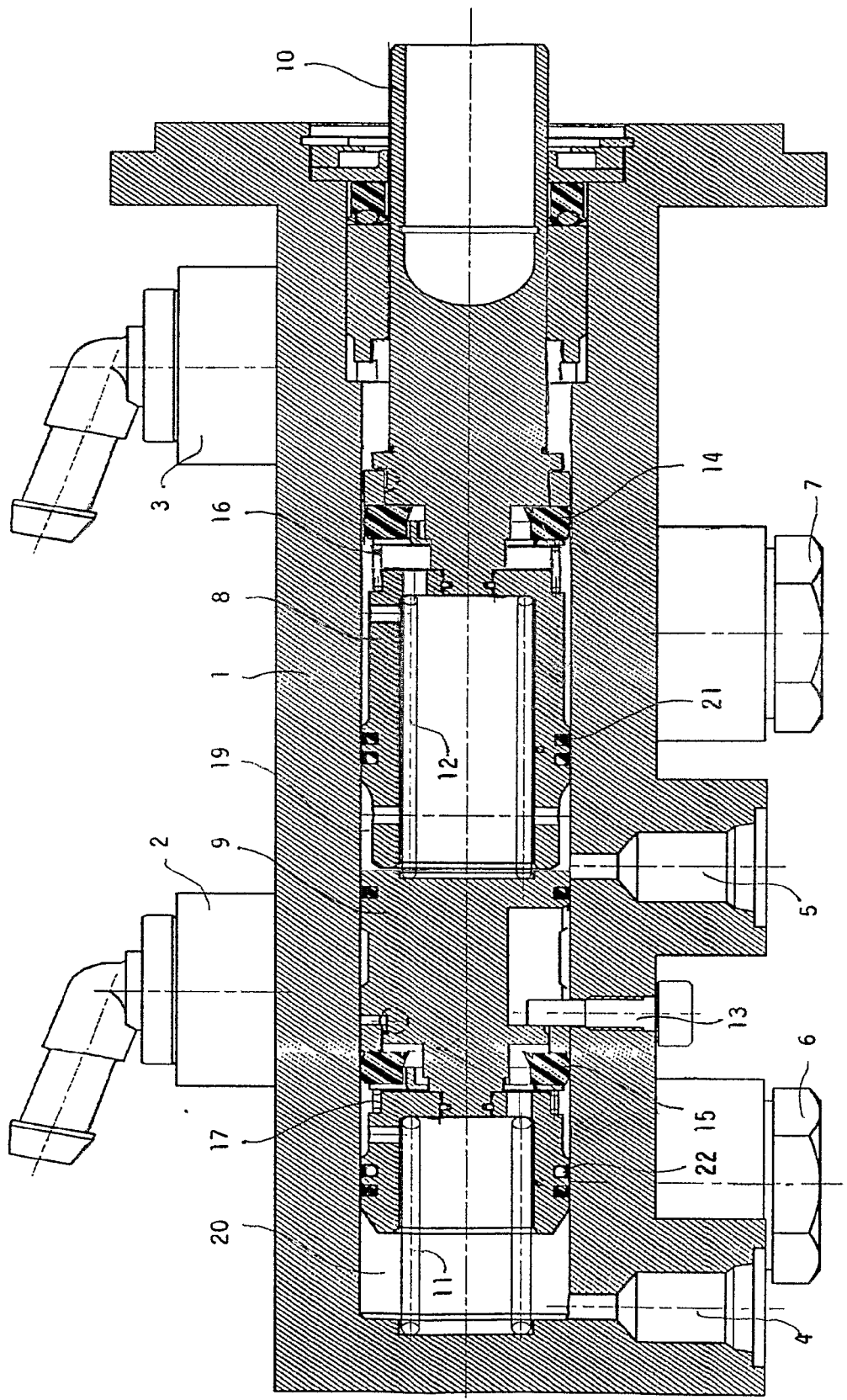

FIG. 5 similarly shows the same tandem master cylinder of FIG. 4, in the condition which it assumes in the case of a breakdown.

Figure 1:
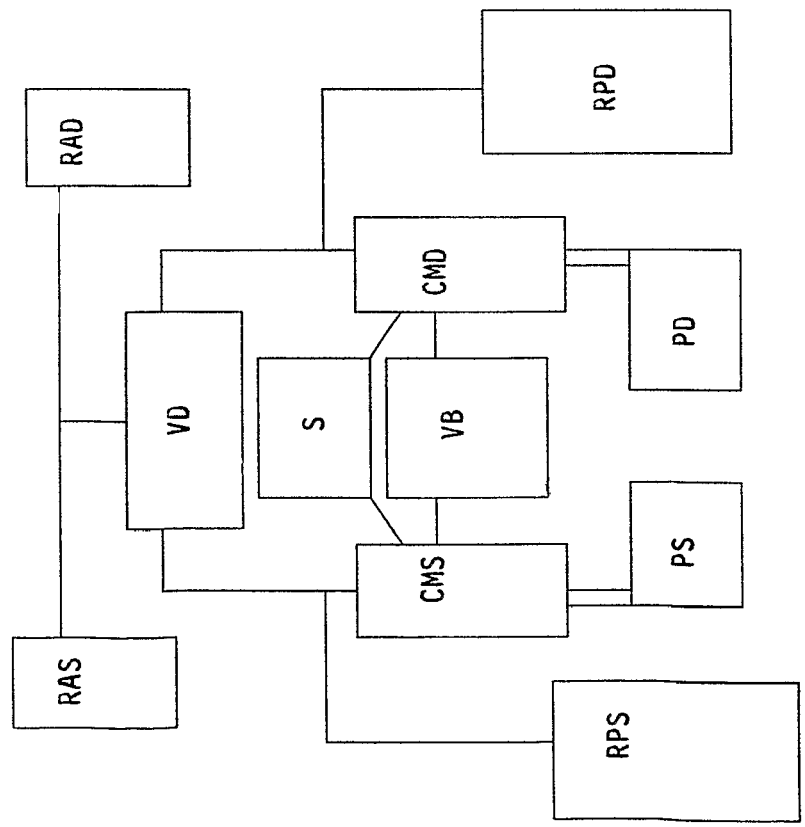
FIG. 1 illustrates the general block diagram of a braking system of the considered kind, designed according to the known technique.

In order to recall the kind of system in discussion, FIG. 1 represents the general block diagram of a system, designed according to the known technique, of the kind in which all the wheels are provided with braking devices.

The vehicle has four wheels: a front left wheel RAS, a front right wheel RAD, a rear left wheel RPS and a rear right wheel RPD, and the braking of these wheels is to be controlled by means of two brake pedals, a left pedal PS and a right pedal PD. To this aim, the left pedal PS is connected to a left master cylinder CMS, which is supplied by a reservoir S and, when pedal PS is operated, delivers pressurized oil to a valve VD, intended to disconnect the front braking, and to the braking device of the rear left wheel RPS. Similarly, the right pedal PD is connected to a right master cylinder CMD, which is supplied by the same reservoir S and, when pedal PD is operated, delivers pressurized oil to the valve VD, intended to disconnect the front braking, and to the braking device of the rear right wheel RPD. The two pedals PS and PD, when separately operated, allow braking the rear vehicle wheel situated on the same side of the operated pedal. The simultaneous operation of both pedals PS and PD allows braking all the vehicle wheels.

In order to balance the braking operation in this latter case, a balance valve VB is inserted between the two master cylinders CMS and CMD and is intended to equalize the hydraulic pressures applied to the brakes of the various wheels when both pedals PS and PD are simultaneously operated. The valve VD disconnects the braking of the front wheels when only one of the pedals PS and PD is operated. In the known systems, the master cylinders are simple master cylinders, not tandem master cylinders.

As it may easily be understood, in the case of a breakdown to any branch of the hydraulic circuits which causes an oil loss, the reservoir S is emptied and the braking function becomes entirely faulting, whereby the vehicle is put in a serious condition of lack of safety.

Figure 2:
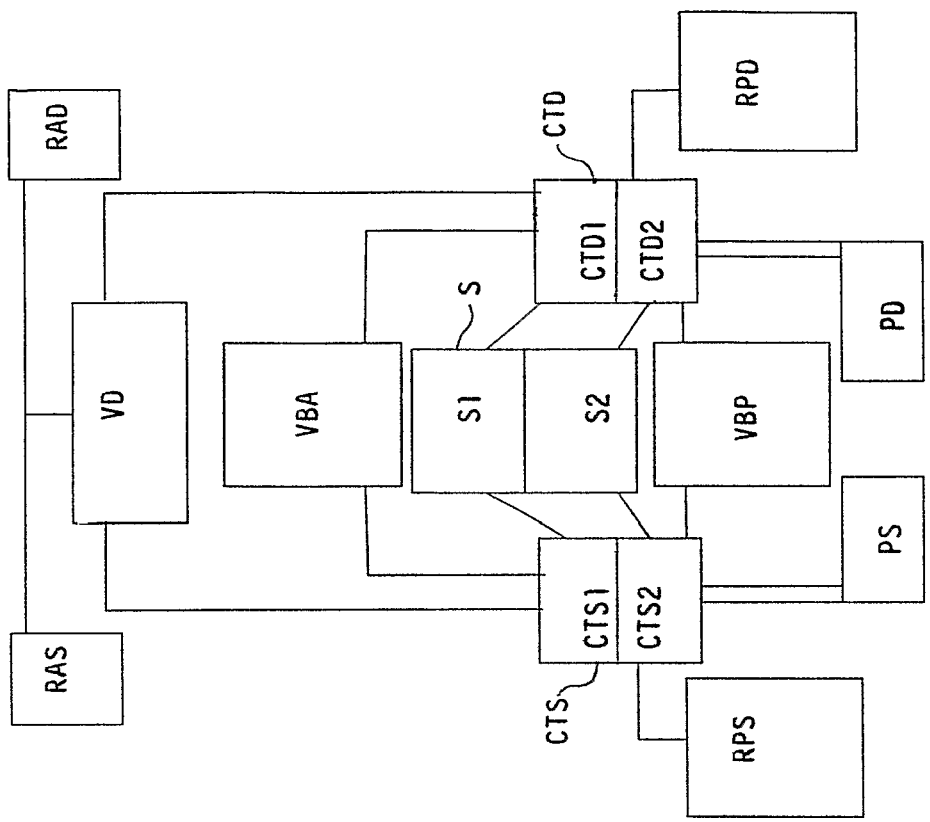
FIG. 2 illustrates in a similar way the general block diagram of a braking system of the considered kind, designed according to an embodiment of the present invention.

FIG. 2 shows the general block diagram of a system of the same kind of the system of FIG. 1, but designed according to the present invention.

The vehicle has four wheels: a front left wheel RAS, a front right wheel RAD, a rear left wheel RPS and a rear right wheel RPD, and the braking of these wheels is to be controlled by means of two brake pedals, a left pedal PS and a right pedal PD. Between the branches of the hydraulic circuits controlling the braking devices of the front wheels RAS and RAD is inserted a valve VD which disconnects the braking of the front wheels when only one of the pedals PS and PD is operated. The left pedal PS is connected to a left master cylinder CTS which, according to the invention, is of the tandem type and therefore comprises two sections CTS1 and CTS2, which sections are supplied by two separate reservoirs S1 and S2 (or, in the practice, by two sections S1 and S2, partially separated, of a single reservoir S). When pedal PS is operated, the section CTS1 delivers pressurized oil to the valve VD, intended to disconnect the front braking, and the section CTS2 delivers pressurized oil to the braking device of the rear left wheel RPS, and causes this wheel to be braked. Similarly, the right pedal PD is connected to a right master cylinder CTD which, according to the invention, is of the tandem type and therefore comprises two sections CTD1 and CTD2, which sections are supplied in oil by the already said separate reservoirs S1 and S2 (or, in the practice, by two sections S1 and S2, partially separated, of a single reservoir S). When pedal PD is operated, the section CTD1 delivers pressurized oil to the valve VD, intended to disconnect the front braking, and the section CTD2 delivers pressurized oil to the braking device of the rear right wheel RPD, and causes this wheel to be braked.

Therefore, as in the known systems, the two pedals PS and PD, when separately operated, allow braking the rear vehicle wheel situated on the same side of the operated pedal, whereas the simultaneous operation of both pedals PS and PD allows braking all the vehicle wheels.

In this case the hydraulic braking circuits of the front and rear wheels are separated, and therefore, in order to balance the braking operation in the case of the simultaneous operation of both pedals PS and PD, two balance valves are provided, namely a first balance valve VBA, inserted between the first sections CTS1 and CTD1 of the two master cylinders CTS and CTD, and a second balance valve VBP, inserted between the second sections CTS2 and CTD2 of the two master cylinders CTS and CTD.

As long as the system does not suffer any breakdown, the braking circuit of the front wheels is controlled through a hydraulic circuit branch separated from the hydraulic circuit branch controlling the braking of the rear wheels, but both sections of each tandem master cylinder are operated simultaneously by the same brake pedal, and therefore they pass the braking action in the same manner to the corresponding front and rear wheels. Moreover, the balance valves VBA and VBP operate simultaneously, when required, the one on the first sections of the tandem master cylinders, and the other on the second sections of the same tandem master cylinders. Therefore, in the normal operating conditions, the whole braking system according to the invention behaves, from all points of view, in a manner identical to the behavior of a corresponding system according to the known technique.

But the behavior of the system is very different when takes place a breakdown which causes oil loss. If the breakdown hits one of the circuit branches concerning the front wheels RAS and RAD, and therefore the first sections CTS1 and CTD1 of the tandem master cylinders CTS and CTD, the oil loss empties these sections and the corresponding reservoir S1. Thus, there is lost the braking function on the front wheels, which was active in the case of the simultaneous operation of both brake pedals. But the reservoir S2, which did not suffer the oil loss, still regularly supplies the second sections CTS2 and CTD2 of the tandem master cylinders CTS and CTD, and therefore the braking function is entirely preserved on the rear wheels RPS and RPD.

In a corresponding manner, when the breakdown hits one of the circuit branches concerning the rear wheels RPS and RPD, and therefore the second sections CTS2 and CTD2 of the tandem master cylinders CTS and CTD, the oil loss empties these sections and the corresponding reservoir S2. Thus, there is lost the braking function on the rear wheels. But the reservoir S1, which did not suffer the oil loss, still regularly supplies the first sections CTS1 and CTD1 of the tandem master cylinders CTS and CTD, and therefore the braking function is entirely preserved on the front wheels RAS and RAD when both brake pedals are simultaneously operated.

As a consequence, in the case of a breakdown, the braking function of the vehicle is only partially lost, and in any event the braking function is preserved either on the rear wheels or on the front wheels of the vehicle, thus allowing in any case the vehicle braking, even if in emergency conditions.

Figure 3:
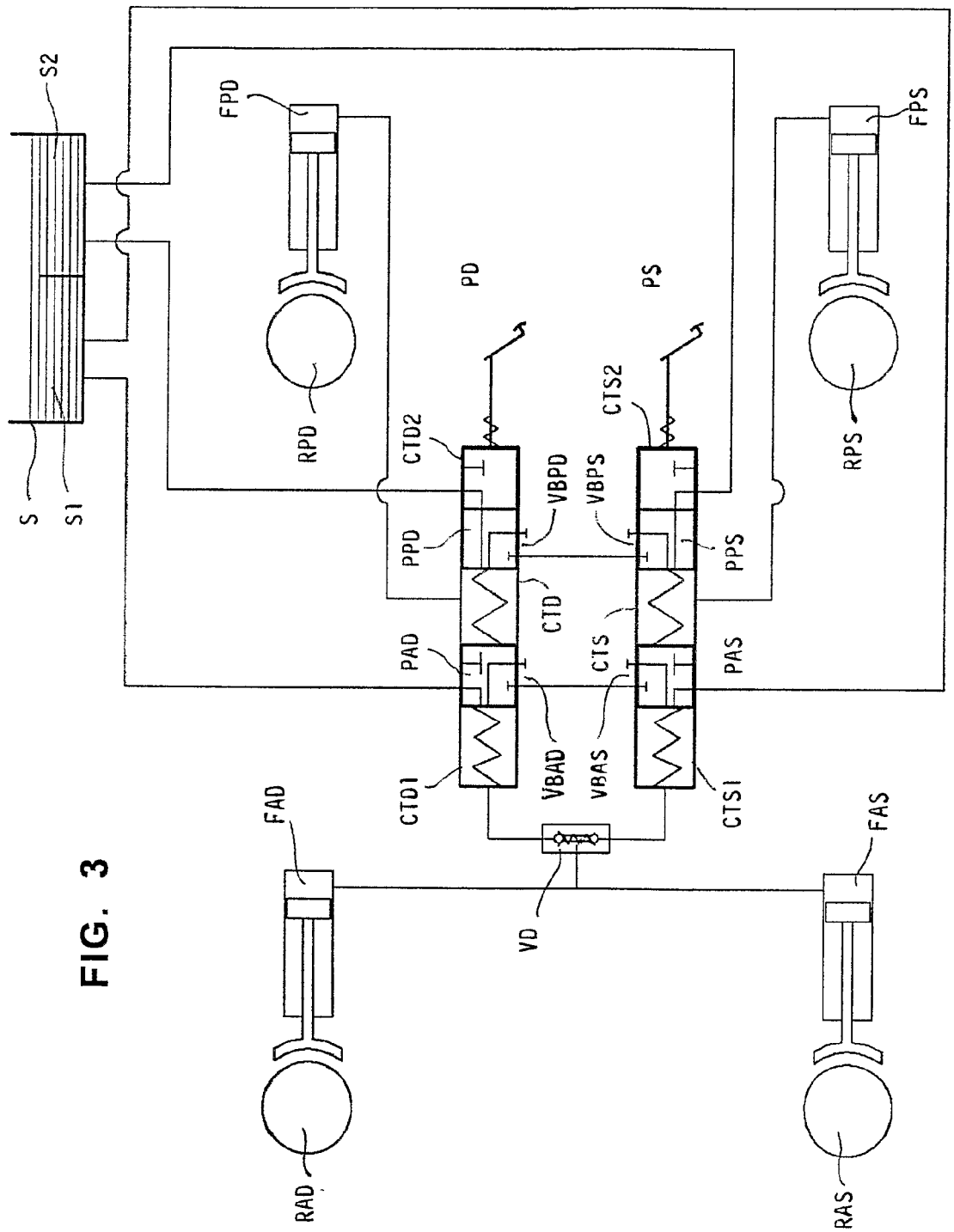
FIG. 3 shows the hydraulic diagram of a braking system according to the described embodiment of the present invention.

FIG. 3 shows the hydraulic diagram of a braking system according to the present invention. To the four vehicle wheels, RAS, RAD, RPS and RPD, are respectively coordinated the hydraulic braking devices FAS, FAD, FPS and FPD. The braking devices FAS and FAD are supplied through the valve VD by the sections CTS1 and CTD1, whereas the braking devices FPS and FPD are supplied, respectively, by the sections CTS2 and CTD2 of the tandem master cylinders CTS and CTD, which are operated by the respective brake pedals PS and PD. The sections CTS1 and CTD1 are supplied by the section S1 of the oil reservoir S, and the sections CTS2 and CTD2 are supplied by the section S2 of the oil reservoir S.

Within the tandem master cylinder CTS are slidably mounted two pistons PAS and PPS, and within the tandem master cylinder CTS are slidably mounted two pistons PAD and PPD. In the pistons PAS and PAD are installed the respective valves VBAS and VBAD, which are mutually connected in order to form in their whole the balance valve VBA, which acts between the first sections CTS1 and CTD1 of the tandem master cylinders CTS and CTD, and therefore in order to balance the bilateral braking on the front wheels; and in the pistons PPS and PPD are installed the respective valves VBPS and VBPD, which are mutually connected in order to form in their whole the balance valve VBP, which acts between the second sections CTS2 and CTD2 of the tandem master cylinders CTS and CTD, and therefore in order to balance the bilateral braking on the rear wheels.

A valve VD, intended to disconnect the front wheels braking in the case of unilateral actuation of the braking, is installed in the usual way in order to operate on both the hydraulic circuits connecting the front braking devices FAS and FAD to the respective sections of the master cylinders CTS and CTD.

FIG. 4 shows in section an embodiment of a tandem master cylinder used according to the invention, in the rest condition. Both tandem master cylinders, the right master cylinder CTD and the left master cylinder CTS, are constructively identical, whereby only one tandem master cylinder will be described.

The tandem master cylinder comprises a body 1 having: two supply connections 2 and 3, intended to be hydraulically connected to the respective oil reservoirs; two delivery connections 4 and 5, intended to be hydraulically connected to the respective braking devices; and two further connections 6 and 7, intended to be hydraulically connected to the corresponding connections of the other tandem master cylinder, in order to form the transfer ducts for balancing the bilateral braking.

The body 1 has a bore wherein are slidably mounted two pistons 8 and 9. Piston 8 is solid with a shaft 10 intended to be mechanically connected to the corresponding brake pedal. A chamber 19 is formed between the pistons 8 and 9, and a chamber 20 is formed between piston 9 and the bottom of the bore of body 1. A spring 11 acts between body I and piston 9, and a spring 12 acts between the pistons 8 and 9, in order to normally keep the pistons 8 and 9 in the shown rest position, which is defined for piston 9 by a stop member 13.

Two packings 21 and 22 cooperate with fixed valve seats and with the pistons 8 and 9, which displace said packings after having traveled along a preestablished stroke, in order to form the balance valves. Two packings 14 and 15 are intended to produce a pressure, after a preestablished stroke, respectively in the chambers 19 and 20, whereas respective springs 16 and 17 keep in their positions said packings before said preestablished stroke has been traveled.

Except for the presence of said balance valves, the tandem master cylinder operates in the manner, well known to those skilled in the art, which is characteristic of the tandem master cylinders. The displacement of piston 8 generates a corresponding pressure in the chamber 19 which is situated between the pistons 8 and 9; this pressure is transmitted to the corresponding braking device through the delivery connection 5, and this pressure also acts on piston 9 causing its corresponding displacement which, in turn, generates a pressure in the chamber 20 situated between piston 9 and the bottom of the bore of body 1. This pressure is transmitted to the corresponding braking device through the delivery connection 4. All this takes place in the normal operation conditions of the system.

If a breakdown hits the braking circuit connected to connection 4, this circuit is emptied along with the respective oil reservoir and therefore, when a braking is operated by acting on the corresponding pedal, at start takes place an idle stroke after which piston 9, which can no more generate a pressure in chamber 20, comes to rest against the bottom of the body bore, and then piston 8, which thanks to the features of the invention is still supplied by its oil reservoir, not interested by the breakdown, and can generate a pressure in chamber 19 and therefore transmit this pressure to the corresponding braking device through the delivery connection 5. The braking devices coordinated with the wheels of a vehicle axle, for example the rear axle, continue to operate regularly in spite of the occurred breakdown; only the braking devices coordinated with the wheels of the other axle, in this example the front axle, discontinue their operation. The vehicle can still be effectively braked, even if in emergency conditions.

If, on the contrary, a breakdown takes place in the braking circuit connected to the delivery connection 5, this circuit is emptied along with the respective oil reservoir and therefore, when a braking is operated by acting on the corresponding pedal, at start takes place an idle stroke after which piston 8, which can no more generate a pressure in chamber 19, comes to rest against the piston 9. This condition is represented in FIG. 5. Then piston 8 transmits the movement, imposed to it by the brake pedal, directly to piston 9, which thanks to the features of the invention is still supplied by its oil reservoir, not interested by the breakdown, and can generate a pressure in chamber 20 and therefore transmit this pressure to the corresponding braking device through the delivery connection 4. The braking devices coordinated with the wheels of a vehicle axle, in this example the front axle, continue to operate regularly in spite of the occurred breakdown; only the braking devices coordinated with the wheels of the other axle, in this example the rear axle, discontinue their operation. The vehicle can still be effectively braked, even if in emergency conditions.

It is to be remarked that both the separate balance valves formed by the two packings 14 and 15 operate in the normal conditions of the system, and in the presence of a breakdown the balance valve that is inserted in the section not involved in the damage continues to operate regularly by balancing the actions of both tandem master cylinders when a bilateral braking is operated.

It is to be understood that the invention is not limited to the embodiment described and represented as an example. Some possible modifications have been stated in the course of the description, and other are within the reach of those skilled in the art.

These changes and others, and any replacement by technically equivalent means, may be introduced in what has been described and illustrated, without departing from the spirit of the invention and the scope of this Patent as defined by the Claims.

The invention claimed is:

1. A braking system for a vehicle having two pairs of wheels (RAS,RAD; RPS,RPD) all provided with brake devices, the system comprising:
   two master cylinders (CTS,CTD) operative as pumps;
   two brake pedals,
   each said brake pedal operatively connected to a corresponding one of said two master cylinders,
   each said master cylinder (CTS, CTD) operated by the corresponding brake pedal (PS, PD),
   each said master cylinder connected to control braking on one rear wheel (RPS, RPD);
   a valve (VD) for disconnection of front vehicle braking,
   each said master cylinder connected to control, via the valve (VD), front vehicle braking,
   the valve (VD) for disconnection of front vehicle braking disconnecting the braking of front wheels (RAS, RAD) when a single one of said two brake pedals (PS, PD) is actuated,
   wherein each master cylinder (CTS, CTD) is a tandem cylinder comprising two pistons (8,9) and two sections (CTS1, CTS2; CTD1, CTD2), a first section of the two sections (CTS1, CTD1) of each master cylinder (CTS, CTD) controlling the braking of the front wheels (RAS, RAD), and a second section of the two sections (CTS2, CTD2) of each master cylinder (CTS,CTD) controlling the braking of the corresponding one rear wheel (RPS, RPD);

a first oil reservoir (S1) connected to supply the first sections (CTS1, CTD1) of said two master cylinders (CTS, CTD);

a second oil reservoir (S2) connected to supply the second sections (CTS2, CTD2) of said two master cylinders (CTS, CTD) at least partially independent from the first oil reservoir (Si); and two separate pairs of balancing valves (VBAD, VBAS; VBPD, VBPS) installed on the two pistons (8,9) of each master cylinder (CTS,CTD), a first pair (VBAD, VBAS) of the two pairs of balancing valves inserted between hydraulic braking control circuits of the front wheels (RAS, RAD), a second pair (VBPD, VBPS) of the two pairs of balancing valves inserted between hydraulic braking control circuits of the rear wheels (RPS, RPD), fluid connections between the master cylinders being normally open with all said balancing valves (VBAD, VBAS; VBPD, VBPS) being normally closed in a rest position of the master cylinders, each of said balancing valves being opened when a corresponding piston (8, 9) travels along a pre-established stroke and remaining then opened for an entire stroke of the corresponding piston, upon only one master cylinder being operated by the corresponding braking pedal, the corresponding balancing valves are opened and the balancing valves of the not-operated master cylinder remain closed, and no balancing takes place, and upon both master cylinders being operated by the corresponding braking pedals, all said balancing valves are opened, and the balancing takes place and remains active during all the braking operation.

2. A braking system for a vehicle having a front pair of wheels (RAS, RAD) and a rear pair of wheels (RPS, RPD), the system comprising:

two master cylinders (CTS,CTD) operative as pumps;

two brake pedals, each said brake pedal operatively connected to a corresponding one of said two master cylinders, each said master cylinder (CTS, CTD) operated by a corresponding one of the two brake pedals (PS, PD), each said master cylinder connected to control braking on only one rear wheel (RPS, RPD);

a valve (VD) for disconnection of front vehicle braking, each said master cylinder connected to control, via the valve (VD), front vehicle braking of the front wheels, the valve (VD) for disconnection of front vehicle braking disconnecting the braking of the front wheels (RAS, RAD) when a single one of said two brake pedals (PS, PD) is actuated, wherein each master cylinder (CTS, CTD) is a tandem cylinder comprising two pistons (8,9) and two sections (CTS1, CTS2; CTD1, CTD2), a first section of the two sections (CTS1, CTD1) of each master cylinder (CTS, CTD) controlling the braking of the front wheels (RAS, RAD), and a second section of the two sections (CTS2, CTD2) of each master cylinder (CTS, CTD) controlling the braking of the corresponding one rear wheel (RPS, RPD);

a first oil reservoir (S1) connected to supply the first sections (CTS1, CTD1) of said two master cylinders (CTS, CTD);

a second oil reservoir (S2) connected to supply the second sections (CTS2, CTD2) of said two master cylinders (CTS, CTD) at least partially independent from the first oil reservoir (S1);

two separate pairs of balancing valves (VBAD, VBAS; VBPD, VBPS) installed on the two pistons (8,9) of each master cylinder (CTS,CTD), a first pair (VBAD, VBAS) of the two pairs of balancing valves inserted between hydraulic braking control circuits of the front wheels (RAS, RAD), a second pair (VBPD, VBPS) of the two pairs of balancing valves inserted between hydraulic braking control circuits of the rear wheels (RPS, RPD), fluid connections between the master cylinders being normally open with all said balancing valves (VBAD, VBAS; VBPD, VBPS) being normally closed in a rest position of the master cylinders, each of said balancing valves being opened when a corresponding piston (8, 9) travels along a pre-established stroke and remaining opened for an entire stroke of the corresponding piston, upon only one master cylinder being operated by the corresponding braking pedal, the corresponding balancing valves opening and the balancing valves of the other, not-operated, master cylinder remaining closed, and upon both master cylinders being operated by the corresponding braking pedals, all said balancing valves opening, and balancing taking place and remains active during all the braking operation.

* * * * *